Patented Sept. 6, 1938

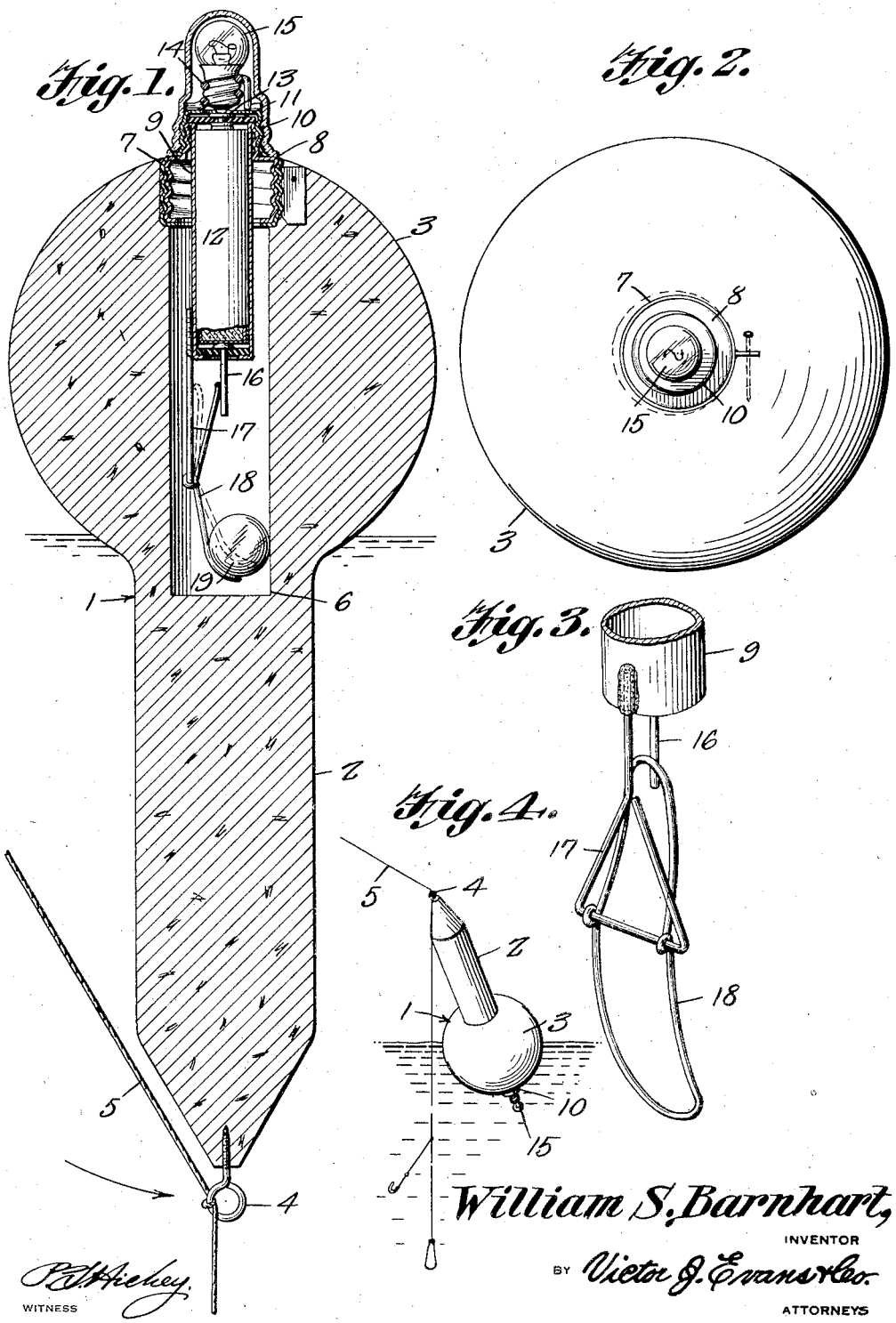

2,128,899

UNITED STATES PATENT OFFICE 2,128,899

FISHING BOBBER

William S. Barnhart, North Fond du Lac, Wis.

Application May 19, 1937, Serial No. 143,590

2 Claims. (Cl. 43—17)

This invention relates to fishing bobbers and has for the primary object the provision of an efficient and inexpensive device of this character which will automatically give an illuminating signal when a fish strikes the bait on the line on which the device is connected so that the fisherman during night fishing may be readily informed of the strike by the fish.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a fishing bobber constructed in accordance with my invention.

Figure 2 is an end elevation illustrating the same.

Figure 3 is a fragmentary perspective view illustrating a circuit maker and breaker.

Figure 4 is a perspective view showing the approximate floating position of the device prior to a strike being made on the line by a fish.

Referring in detail to the drawing, the numeral 1 indicates a body constructed of buoyant material and includes a substantially cylindrical portion 2 and a substantially spherical-shaped portion 3. The free end of the portion 2 is tapered and has secured thereto an eye type fastener 4 to permit the device to be easily connected to a fishing line 5. The spherical-shaped portion 3 of the body has formed therein a chamber 6 which opens outwardly through a face of the portion 3 opposite the portion 2. Mounted in a portion of the chamber 3 is a threaded ferrule 7. A threaded sleeve 8 threads into the ferrule 7 and forms a part of a battery case 9 constructed of conductive material. A portion of the sleeve 8 is reduced and threaded to receive a threaded cap 10. The cap 10 clamps between itself and the open end of the battery case an insulating disc 11. A battery 12 of a dry cell type is mounted in the case 9 and is electrically grounded thereto and its terminal engages a contact 13 carried by the disc 11 and which is exposed by an opening formed in the cap 10. An electric lamp socket 14 is carried by the cap to support an electric lamp 15 with a contact thereof in engagement with the contact 13. The socket 14 grounds the electric lamp onto the case 9 by being threaded onto the sleeve 8. A contact 16 is supported by and insulated from the case 9 and engages the battery. A bracket 17 is carried by the case 9 and has hinged thereon a contact lever 18 provided with a ball engaging portion having a slight curvature thereto. Operating within the walls of the chamber 6 is a ball 19 of insulating material. When the ball gravitates in the chamber 6 it engages with the curved portion of the lever 18 and brings the opposite end of said lever in engagement with the contact 16 completing the electric circuit from the battery to the electric lamp. The ball 19 is constructed of insulated material so that should it engage with the contact 16 and the lever 18 at the same time it will not complete the electric circuit.

In use, the device is connected to a fishing line a selected distance from the hook and sinker and when cast into the water it will assume a floating position, as shown in Figure 4, that is, with the portion 2 disposed substantially vertically above the surface of the water. The ball, when the device is in this position will move the lever 18 away from the contact 16, breaking the circuit to the electric lamp. However, when a fish strikes the bait on the hook causing a pull on the line, the device will invert its position from that shown in Figure 3 and the ball gravitating moves the lever 18 in engagement with the contact 16, completing the electric circuit to the electric lamp, consequently giving a signal which may be clearly seen at night time.

What is claimed is:

1. A fishing bobber comprising a buoyant body including an elongated shaped portion and a spherical shaped portion, means for connecting the elongated shaped portion onto a fishing line, said spherical shaped portion having a chamber, a battery supporting means located in said chamber, an electric lamp carried by said battery supporting means, a battery carried by said battery supporting means, and a gravity actuated switch controlling the circuit between said battery and the electric lamp and affected by the position assumed by the body.

2. A fishing bobber comprising a buoyant body having a chamber, a battery case mounted in said chamber, a battery carried by said case, an electric lamp electrically connected to said battery and supported on said case exteriorly of the body, a bracket carried by said case, a contact carried by and insulated from said case and engaging the battery, a pivoted lever carried by said bracket, and a ball operable in the chamber by gravity to engage and disengage the lever with said contact in accordance with the positions assumed by the body in the water.

WILLIAM S. BARNHART.